United States Patent
Zhang et al.

(10) Patent No.: US 10,092,878 B2
(45) Date of Patent: Oct. 9, 2018

(54) SYSTEM AND METHOD FOR MIXING TEMPERING AIR WITH FLUE GAS FOR HOT SCR CATALYST

(71) Applicant: General Electric Company, Schenectady, NY (US)

(72) Inventors: Hua Zhang, Greenville, SC (US); Laxmikant Merchant, Bangalore (IN); Bradly Aaron Kippel, Greenville, SC (US); Valery Ivanovich Ponyavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/060,161

(22) Filed: Mar. 3, 2016

(65) Prior Publication Data
US 2017/0252698 A1   Sep. 7, 2017

(51) Int. Cl.
*B01D 53/94* (2006.01)
*F01N 3/28* (2006.01)
(Continued)

(52) U.S. Cl.
CPC ..... *B01D 53/9418* (2013.01); *B01D 53/9431* (2013.01); *F01D 25/305* (2013.01);
(Continued)

(58) Field of Classification Search
CPC ..... Y02E 20/16; F01D 25/305; F01N 3/2066; F01N 2610/02; F01N 3/0842;
(Continued)

(56) References Cited

U.S. PATENT DOCUMENTS

| | | | | |
|---|---|---|---|---|
| 959,597 A | * | 5/1910 | Pollock | F02M 29/02 48/189.5 |
| 6,449,947 B1 | | 9/2002 | Liu et al. | |

(Continued)

FOREIGN PATENT DOCUMENTS

EP   3 187 701 A1   7/2017

OTHER PUBLICATIONS

Metal Perforated Plate Corrugated Packing, Pansco Structured Packing Products, Inc., 1999-2012, pp. 1-2.
Extended European Search Report and Opinion issued in connection with corresponding EP Application No. 17157812.3 dated Jul. 18, 2017.

*Primary Examiner* — Amber R Orlando
*Assistant Examiner* — Syed T Iqbal
(74) *Attorney, Agent, or Firm* — Fletcher Yoder, P.C.

(57) ABSTRACT

A simple-cycle gas turbine system includes an injection system including a plurality of injection tubes that may inject a fluid into a duct of an exhaust processing system that may process exhaust gas generated by a gas turbine engine. The exhaust processing system includes a selective catalytic reduction (SCR) system that may reduce a level of nitrogen oxides ($NO_x$) within the exhaust gas; and a mixing system positioned adjacent to the plurality of injection tubes and within the exhaust processing system. The mixing system includes a mixing module having a plurality of turbulators that may swirl the fluid, or the exhaust gas, or both, in a first swirl direction to encourage turbulent flow along an axis of the exhaust processing system and thereby facilitate mixing between the fluid and the exhaust gas.

20 Claims, 6 Drawing Sheets (51) Int. Cl.
  *F01N 3/20*       (2006.01)
  *F01D 25/30*      (2006.01)
  *F02C 7/141*      (2006.01)
  *F02C 7/18*       (2006.01)
  *B01D 53/86*      (2006.01)

(52) U.S. Cl.
  CPC ......... *F01N 3/2066* (2013.01); *F01N 3/2892* (2013.01); *F02C 7/141* (2013.01); *F02C 7/18* (2013.01); *B01D 53/8631* (2013.01); *B01D 2258/0283* (2013.01); *F01N 2240/20* (2013.01); *F05D 2240/127* (2013.01); *F05D 2250/61* (2013.01); *F05D 2260/2212* (2013.01); *F05D 2270/082* (2013.01); *Y02T 10/24* (2013.01)

(58) Field of Classification Search
  CPC ...... F01N 3/035; F01N 3/2892; F01N 3/0814; F01N 3/208; F01N 2610/1453; F01N 2240/20; F01N 2570/14; F01N 13/0093; F01N 2370/02; F01N 11/002; F01N 13/009; F01N 3/106; F01N 9/00; F01N 11/00; F01N 13/10; F01N 2900/1602; F01N 3/101; F01N 3/206; F01N 2470/18; F01N 2250/02; F01N 2560/026; F01N 2560/06; F01N 2610/03; F01N 2610/1406; F01N 2900/08; F01N 2900/1808; F01N 3/0222; F01N 3/027; F01N 3/0821; F01N 3/10; F01N 3/103; F01N 9/002; F01N 11/007; F01N 13/0097; F01N 13/011; F01N 13/08; F01N 2370/04; F01N 2430/06; F01N 2470/04; F01N 2550/05; F01N 2610/01; F01N 2610/11; F01N 2610/14; F01N 2610/146; F01N 2900/0422; F01N 2900/1404; F01N 2900/1821; F01N 2900/1822; F01N 3/021; F01N 3/20; F01N 3/2033; F01N 3/2882; F01N 3/36; F01N 11/005; F01N 13/007; F01N 13/008; F01N 13/102; F01N 13/143; F01N 13/1811; F01N 13/1827; F01N 13/1888; F01N 2240/00; F01N 2240/02; F01N 2240/05; F01N 2240/16; F01N 2240/25; F01N 2240/26; F01N 2260/024; F01N 2260/10; F01N 2330/30; F01N 2340/06; F01N 2410/02; F01N 2450/18; F01N 2470/00; F01N 2470/02; F01N 2470/08; F01N 2470/20; F01N 2490/18; F01N 2510/063; F01N 2530/18; F01N 2530/22; F01N 2550/04; F01N 2560/025; F01N 2560/07; F01N 2560/08; F01N 2560/14; F01N 2590/02; F01N 2590/10; F01N 2610/00; F01N 2610/08; F01N 2610/10; F01N 2610/102; F01N 2610/1426; F01N 2610/148; F01N 2610/1486; F01N 2900/0402; F01N 2900/10; F01N 2900/14; F01N 2900/1402; F01N 2900/1614; F01N 2900/1621; F01N 2900/1624; F01N 2900/1812; F01N 3/023; F01N 3/0233; F01N 3/0253; F01N 3/043; F01N 3/0878; F01N 3/0885; F01N 3/2006; F01N 3/2013; F01N 3/2026; F01N 3/281; F01N 3/2825; F01N 3/2828; F01N 3/2839; F01N 5/02; F01N 5/04; B01D 53/9418; B01D 2255/9155; B01D 2255/50; B01D 2255/1023; B01D 2255/20761; B01D 53/944; B01D 53/9495; B01D 2258/0283; B01D 2255/1021; B01D 2255/20738; B01D 2258/012; B01D 2251/2062; B01D 2251/2067; B01D 2255/2065; B01D 2255/20715; B01D 2255/904; B01D 53/8628; B01D 53/9477; B01D 2255/1025; B01D 2255/2042; B01D 2255/20707; B01D 2255/20723; B01D 2255/2092; B01D 2255/40; B01D 2255/9032; B01D 2255/9202; B01D 53/78; B01D 53/9431; B01D 53/96; B01D 2255/102; B01D 2255/2047; B01D 2255/2073; B01D 2255/20753; B01D 2255/91; B01D 53/62; B01D 53/9422; B01D 53/9463; B01D 2251/402; B01D 2255/20746; B01D 2255/30; B01D 2255/407; B01D 2255/502; B01D 2255/9022; B01D 2255/9025; B01D 2255/903; B01D 2255/9045; B01D 2255/908; B01D 2255/9205; B01D 2257/40; B01D 2257/404; B01D 2257/504; B01D 2258/01; B01D 53/1493; B01D 53/56; B01D 53/64; B01D 53/75; B01D 53/8643; B01D 53/9413; B01D 53/9427; B01D 53/945; B01D 53/9472; B01D 15/08; B01D 2251/206; B01D 2251/208; B01D 2251/304; B01D 2251/602; B01D 2251/604; B01D 2251/606; B01D 2252/2041; B01D 2252/20421; B01D 2252/60; B01D 2253/102; B01D 2253/1085; B01D 2253/1124; B01D 2253/302; B01D 2255/104; B01D 2255/202; B01D 2255/2022; B01D 2255/2025; B01D 2255/2027; B01D 2255/204; B01D 2255/2045; B01D 2255/206; B01D 2255/2063; B01D 2255/2068; B01D 2255/20769; B01D 2255/20776; B01D 2255/209; B01D 2255/504; B01D 2255/911; B01D 2255/9207; B01D 2257/202; B01D 2257/2022; B01D 2257/402; B01D 2257/406; B01D 2257/60; B01D 2257/602; B01D 2258/0241; B01D 2258/025; B01D 2259/4566; B01D 29/11; B01D 35/02; B01D 45/16; B01D 46/0039; B01D 53/00; B01D 53/02; B01D 53/0462; B01D 53/0476; B01D 53/1425; B01D 53/1475; B01D 53/346; B01D 53/40; B01D 53/50; B01D 53/508; B01D 53/68; B01D 53/82; B01D 53/8625; B01D 53/864; B01D 53/8665; B01D 53/88; B01D 53/90; B01D 53/9436; B01D 53/9468; F02C 7/18; F02C 3/04; F02C 9/18; F02C 7/14; F02C 7/141; F02C 7/185; F02C 3/06; F02C 3/10; F02C 3/107; F02C 3/14; F02C 3/30; F02C 3/34; F02C 7/052; F02C 7/06; F02C 7/232; F02C 7/28; F02C 7/32; B01J 35/04; B01J 35/0006; B01J 23/44; B01J 29/763; B01J 23/10; B01J 35/023; B01J 37/0236; B01J 37/0246; B01J 37/08; B01J 23/464; B01J 37/0244; B01J 37/0248; B01J 23/42; B01J 29/85; B01J 37/0215; B01J 20/20; B01J 21/04; B01J 2229/183; B01J 2229/186; B01J 23/22; B01J 29/061; B01J 29/072; B01J 29/723; B01J 29/76; B01J 29/80; B01J 35/002; B01J 35/0066; B01J 35/06; B01J 37/088; B01J 2029/062; B01J 20/04; B01J 20/041; B01J 20/043; B01J 20/28004; B01J 20/28011; B01J 20/3078; B01J 20/3085; B01J 20/3236; B01J 20/3433; B01J 20/3483; B01J 20/3491; B01J 21/12; B01J 2220/42; B01J 2229/24; B01J 2229/30; B01J 2229/38; B01J 2229/42; B01J 23/002; B01J 23/005; B01J 23/02; B01J 23/04; B01J 23/28; B01J 23/30; B01J 23/63; B01J 23/6562; B01J 23/8926; B01J 23/92; B01J 2523/41; B01J 29/06

See application file for complete search history.

(56) References Cited

U.S. PATENT DOCUMENTS

| | | | |
|---|---|---|---|
| 7,069,716 | B1 | 7/2006 | Childers |
| 7,383,850 | B2* | 6/2008 | Buzanowski .......... B01D 53/79 137/1 |
| 7,784,262 | B2* | 8/2010 | Leser .................... F22B 1/1815 60/39.182 |
| 8,186,152 | B2 | 5/2012 | Zhang et al. |
| 8,516,786 | B2 | 8/2013 | Zhang et al. |
| 8,596,073 | B2 | 12/2013 | Zhang |
| 2010/0024379 | A1 | 2/2010 | Sengar et al. |
| 2011/0036066 | A1* | 2/2011 | Zhang .................. F01D 25/305 60/39.5 |
| 2015/0041014 | A1 | 2/2015 | Ferguson |

* cited by examiner

SYSTEM AND METHOD FOR MIXING TEMPERING AIR WITH FLUE GAS FOR HOT SCR CATALYST

BACKGROUND OF THE INVENTION

The subject matter disclosed herein relates to turbine systems and, more specifically, to exhaust gas processing.

Gas turbine systems typically include at least one gas turbine engine having a compressor, a combustor, and a turbine. The combustor is configured to combust a mixture of fuel and compressed air to generate hot combustion gases, which, in turn, drive blades of the turbine. Exhaust gas produced by the gas turbine engine may include certain byproducts, such as nitrogen oxides ($NO_x$), sulfur oxides ($SO_x$), carbon oxides ($CO_x$), and unburned hydrocarbons. In general, it is desirable to eliminate or substantially reduce the amount of such byproducts in the exhaust gas before the exhaust gas exits the gas turbine system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a simple-cycle gas turbine system includes an injection system including a plurality of injection tubes that may inject a fluid into a duct of an exhaust processing system that may process exhaust gas generated by a gas turbine engine. The exhaust processing system includes a selective catalytic reduction (SCR) system that may reduce a level of nitrogen oxides ($NO_x$) within the exhaust gas; and a mixing system positioned adjacent to the plurality of injection tubes and within the exhaust processing system. The mixing system includes a mixing module having a plurality of turbulators that may swirl the fluid, or the exhaust gas, or both, in a first swirl direction to encourage turbulent flow along an axis of the exhaust processing system and thereby facilitate mixing between the fluid and the exhaust gas.

In a second embodiment, a simple cycle heavy-duty gas turbine system includes a mixing system disposed in an exhaust processing system of the simple cycle heavy-duty gas turbine system. The mixing system includes a first mixing module including a first plurality of turbulators configured and positioned within the exhaust processing system to swirl cooling air, an exhaust stream generated by a heavy-duty gas turbine engine of the simple cycle heavy-duty gas turbine system, or both, in a first swirl direction; and a second mixing module including a second plurality of turbulators that may swirl the cooling air, the exhaust stream, or both, in a second swirl direction.

In a third embodiment, a method of processing exhaust gas in a simple cycle gas turbine system includes flowing an exhaust stream from a gas turbine engine and into a transition section of an exhaust processing system, injecting cooling air into a flow of the exhaust stream in the transition section using an air injection system including a plurality of air injection tubes that may inject the cooling air; and swirling the exhaust stream, or the cooling air, or both, in the transition section of the exhaust processing system using a mixing system having an array of mixing modules. Each mixing module of the array of mixing modules includes a plurality of turbulators that may swirl the exhaust stream, the cooling air, or both in a first direction, a second direction, or both, and swirling the exhaust gas, the air, or both mixes and facilitates heat transfer between the exhaust steam and the cooling air within the exhaust processing system to generate a cooled exhaust gas. The method also includes directing the cooled exhaust gas to a selective catalytic reduction (SCR) system, and reducing a level of nitrogen oxides (NOx) in the cooled exhaust gas using the SCR system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments disclosed herein generally relate to techniques for cooling or tempering an exhaust gas flow. For instance, in gas turbine systems, one or more gas turbine engines may combust a fuel to produce combustion gases for driving one or more turbine blades. Depending on the type of fuel that is combusted, emissions (e.g., exhaust gases) resulting from the combustion process may include nitrogen oxides ($NO_x$), sulfur oxides ($SO_x$), carbon oxides ($CO_x$), and unburned hydrocarbons. Often, it may be desirable to reduce a level of these components before the exhaust gases exits the gas turbine system, such as a gas turbine power generation plant, while also maintaining efficient operation of the gas turbine system.

One technique for removing or reducing the amount of NO in an exhaust gas stream is by Selective Catalytic Reduction (SCR). In an SCR process, a reagent, such as ammonia ($NH_3$) is injected into the exhaust gas stream and reacts with the NO in the exhaust gas and in the presence of a catalyst to produce nitrogen ($N_2$) and water ($H_2O$). The effectiveness of the SCR process may be at least partially dependent upon the temperature of the exhaust gas that is processed, which may be dependent on the particular catalyst used by the SCR system. For instance, the SCR process for removing NO may be particularly effective at temperatures of approximately 500 to 900 degrees Fahrenheit (° F.). Thus, where the exhaust gas output from the turbine engine is higher than the effective temperature range for SCR, it may be beneficial to cool the exhaust gases prior to SCR to increase the effectiveness of the SCR process (e.g., removal of $NO_x$).

In accordance with embodiments of the present disclosure, a gas turbine system, such as a simple cycle heavy-duty gas turbine system, may include an air injection system configured to inject cooling fluid (e.g., air) into an exhaust gas stream. In addition, the gas turbine system may include a mixing system having a mixing module that includes a plurality of turbulators that facilitate mixing of the cooling fluid and the exhaust gas. As will be described further below, the mixing system may be disposed downstream (i.e., relative to the flow of exhaust gases) of the air injection system, but upstream of an SCR system. The turbulators of the mixing system may include swirl structures that create swirling in the flow of the cooling fluid, exhaust gas, or both to encourage uniform mixing of the cooling fluid and the exhaust gas. In certain embodiments, the gas turbine system may include an array of mixing modules. Each mixing module in the array may create the same or a different swirl pattern. In accordance with these presently disclosed techniques, the mixing system may provide for improved uniformity in temperature and/or velocity distributions of cooled exhaust gas (e.g., the mixture of the cooling fluid and the exhaust gas) received by the SCR system. Further, while the presently disclosed techniques may be particularly useful in simple cycle heavy-duty gas turbine systems, as will be discussed below, it should be understood that the present technique may be implemented in any suitably configured system, including combined cycle gas turbine systems, for example.

Figure 1:
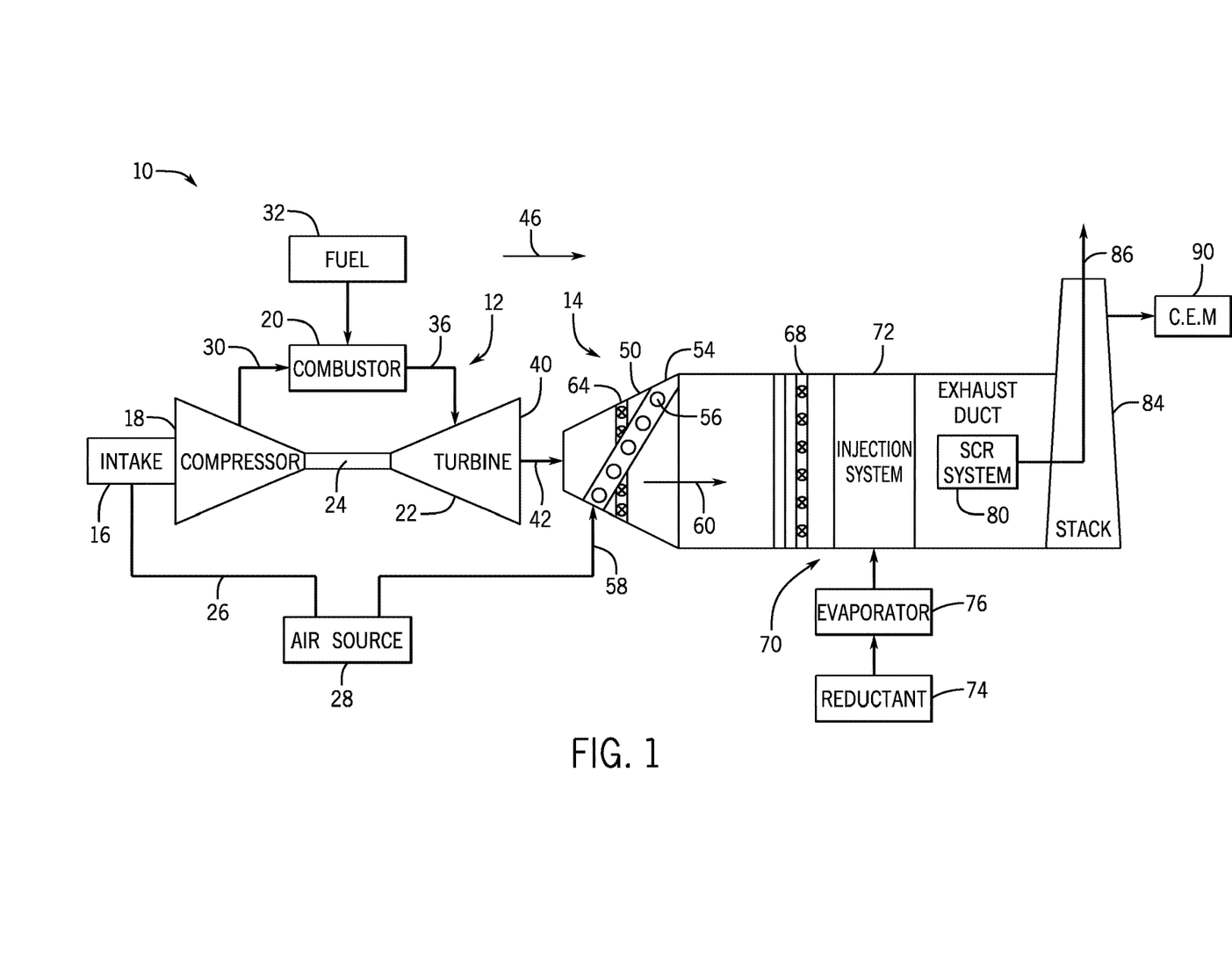
FIG. 1 is a block diagram of a gas turbine system including a mixing system configured to mix exhaust gas with cooling air within an exhaust processing system, in accordance with an embodiment of the present disclosure.

With the foregoing in mind, FIG. 1 is a schematic diagram of an example turbine system 10 that includes a gas turbine engine 12 and an exhaust processing system 14. In certain embodiments, the turbine system 10 may be all or part of a power generation system. The gas turbine system 10 may use liquid or gas fuel, such as natural gas and/or a hydrogen-rich synthetic gas, to run the gas turbine system 10.

As shown, the gas turbine engine 12 includes an air intake section 16, a compressor 18, a combustor section 20, and a turbine 22. The turbine 22 may be drivingly coupled to the compressor 18 via a shaft 24. In operation, air enters the turbine engine 12 through the air intake section 16 (indicated by the arrow 26) and is pressurized in the compressor 18. The air 26 may be provided by one or more air sources 28 (e.g., including but not limited to ambient air). In certain embodiments, the air 26 may flow through a filter and/or a silencer disposed between the compressor 18 and the air source 28. The compressor 18 may include a plurality of compressor stages coupled to the shaft 24. Each stage of the compressor 18 includes a wheel with a plurality of compressor blades. The rotation of the shaft 24 causes rotation of the compressor blades, which draws air into the compressor 18 and compresses the air 26 to produce compressed air 30 prior to entry into the combustor section 20.

The combustor section 20 may include one or more combustors. In one embodiment, a plurality of combustors may be disposed at multiple circumferential positions in a generally circular or annular configuration about the shaft 24. As the compressed air 30 exits the compressor 18 and enters the combustor section 20, the compressed air 30 may be mixed with fuel 32 for combustion within the combustor. For example, the combustor may include one or more fuel nozzles that may inject a fuel-air mixture into the combustor in a suitable ratio for optimal combustion, emissions, fuel consumption, power output, and so forth. The combustion of the air 30 and fuel 32 may generate hot pressurized exhaust gases 36 (e.g., combustion gases), which may then be utilized to drive one or more turbine blades within the turbine 22. In operation, the combustion gases flowing into and through the turbine 22 flow against and between the turbine blades, thereby driving the turbine blades and, thus, the shaft 24 into rotation to drive a load, such as an electrical generator in a power plant. As discussed above, the rotation of the shaft 24 also causes blades within the compressor 18 to draw in and pressurize the air received by the intake 16.

The combustion gases that flow through the turbine 22 may exit a downstream end 40 of the turbine 22 as a stream of exhaust gas 42. The exhaust gas stream 42 may continue to flow in a downstream direction 46 towards the exhaust processing system 14. For instance, the downstream end 40 of the turbine 22 may be fluidly coupled to the exhaust processing system 14 and, particularly, to a transition duct 50. In certain embodiments, the exhaust processing system 14 may include an exhaust diffuser upstream of the transition duct 50.

As discussed above, as a result of the combustion process, the exhaust gas stream 42 may include certain byproducts, such as nitrogen oxides ($NO_x$), sulfur oxides ($SO_x$), carbon oxides ($CO_x$), and unburned hydrocarbons. The exhaust processing system 14 may be employed to reduce or substantially minimize the concentration of such byproducts before the exhaust gas stream exits the system 10. As mentioned above, one technique for removing or reducing the amount of $NO_x$ in an exhaust gas stream is by using a Selective Catalytic Reduction (SCR) process. For example, in an SCR process for removing $NO_x$ from the exhaust gas stream 42, ammonia ($NH_3$) is injected into the exhaust gas stream and reacts with the $NO_x$ in the presence of a catalyst to produce nitrogen ($N_2$) and water ($H_2O$).

The effectiveness of this SCR process may be at least partially dependent upon the temperature of the exhaust gas that is processed. For instance, the SCR process for removing $NO_x$ may be particularly effective at temperatures of approximately 500 to 900 degrees Fahrenheit (° F.). In certain embodiments, however, the exhaust gas stream 42 exiting the turbine 22 and entering the transition duct 30 may have a temperature of approximately 1000 to 1500° F. or, more specifically, 1100 to 1200° F. Accordingly, to increase the effectiveness of the SCR process for $NO_x$ removal, the exhaust processing system 14 may include an air injection system 54 configured to inject cooling air into the exhaust gas stream 42, thereby cooling the exhaust gas stream 42 prior to SCR. It should be understood that the effective temperatures may vary depending on the element being removed from the gas stream 26 and/or the catalyst being employed.

As shown in FIG. 1, the air injection system 54 may be disposed within the transition duct 50. The air injection system 54 may include a plurality of air injection tubes 56 having a plurality of air injection holes configured to inject cooling air 58 provided by the one or more air sources 28 into the transition duct 50 for mixture with the exhaust gas stream 42. For instance, in one embodiment, the air source 28 may include one or more air blowers, compressors (e.g., compressor 18), heat exchangers, or a combination thereof. As will be appreciated, the term "cooling," when used to describe the air flow 58, should be understood to mean that the air 58 is cooler relative to the exhaust gas stream 42 exiting the turbine 22. For example, the cooling air 58 supplied by the air source 28 may be ambient air, or may be further cooled using a heat exchanger or other type of suitable cooling mechanism. The air injection system 54 may also include valves for regulating the flow of cooling air 58. By way of example only, in one embodiment, the exhaust gas stream 42 output from the turbine 22 may flow into the transition duct 50 at a rate of approximately 1000 pounds/second, and cooling air 58 may be injected into the transition duct 50 (via the air injection system 54) at a rate of approximately 500 pounds/second. It should be understood, however, that the flow rate of exhaust gas stream 42 and the flow rate of the cooling air 58 may vary. The cooling air 58 mixes with the exhaust gas stream 42 to produce a cooled exhaust gas stream 60. As discussed above, the cooled exhaust gas 60 may have a temperature of approximately 500 to 900 degrees ° F., i.e., a temperature suitable for increasing or substantially maximizing $NO_x$ removal in the SCR process. As will be discussed further below, the exhaust processing system 14 includes mixing systems 64, 68 along the flow path of the exhaust gas stream 42, 60 configured to facilitate mixing of the exhaust gas stream 42 and the cooling air 58 to achieve a uniform temperature distribution in the cooled exhaust gas 60 prior to downstream SCR processing.

Referring still to FIG. 1, the cooled exhaust gas stream 60 may continue flowing downstream (e.g., in direction 46) into an exhaust duct 70 where the exhaust gas stream 60 may flow through an injection system 72 configured to inject a reductant 74 (e.g., ammonia ($NH_3$)) into the cooled exhaust gas stream 60. In one embodiment, the injection grid 72 may include a network of pipes with openings for injecting the reductant 74 into the cooled exhaust gas stream 60. The reductant 74 may be vaporized in evaporator 76 before flowing into the injection grid 72.

Downstream of the injection grid 72, an SCR system 80 may include a supported catalyst system having any suitable geometry, such as a honeycomb or plate configuration. Within the SCR system 80, the reductant 74 reacts with the $NO_x$ in the cooled exhaust gas 60 to produce nitrogen ($N_2$) and water ($H_2O$), thus removing $NO_x$ from the cooled exhaust gas 60 prior to exiting the gas turbine system 10 through a stack 84, as indicated by the flow arrow 86. The stack 84, in some embodiments, may include a silencer or muffler. By way of non-limiting example, the exhaust processing system 14 may utilize the air injection system 54, the mixing systems 64, 68, and the SCR system 80 to reduce the composition of $NO_x$ in the processed exhaust gas stream 86, to approximately 3 ppm or less. In another embodiment, atomized water may be mixed with the cooling air 58, and the water-air mixture may be injected into the transition duct 50 to lower exhaust gas temperature.

While the present disclosure describes several embodiments directed to the processing and removal of $NO_x$ from the exhaust gas stream 42, 60, certain embodiments may provide for the removal of other combustion byproducts, such as carbon monoxide or unburned hydrocarbons. As such, the supplied catalyst may vary depending on the composition that is being removed from the exhaust gas stream 42, 60. Additionally, it should be understood that the embodiments disclosed herein are not limited to the use of one SCR system 80, but may also include multiple SCR systems 80, multiple catalytic systems, and so forth.

To provide for control of emissions from the system 10, the system 10 may also include a continuous emissions monitoring (CEM) system 90 that continuously monitors the composition of the processed exhaust stream 86 exiting the stack 84. If the CEM system 90 detects that the composition of the processed exhaust stream 86 is not within a predetermined set of parameters (e.g., temperature, pressure, concentration of certain combustion products), the CEM system 90 may provide notification to an appropriate regulatory entity (e.g., Environmental Protection Agency), which may be tasked with instigating further action, such as notifying the operators of the system 10 to adjust operating parameters, perform service, or otherwise cease operating the system 10 until it can be determined that the processed exhaust stream 86 produced by the system 10 conforms with the regulatory requirements. In some embodiments, the CEM system 90 may also implement corrective actions specifically relating to the exhaust processing system 14, such as adjusting gas turbine firing temperature, flow rates of cooling air 58, an amount of reductant 74 injected into duct 50, etc.

Figure 2:
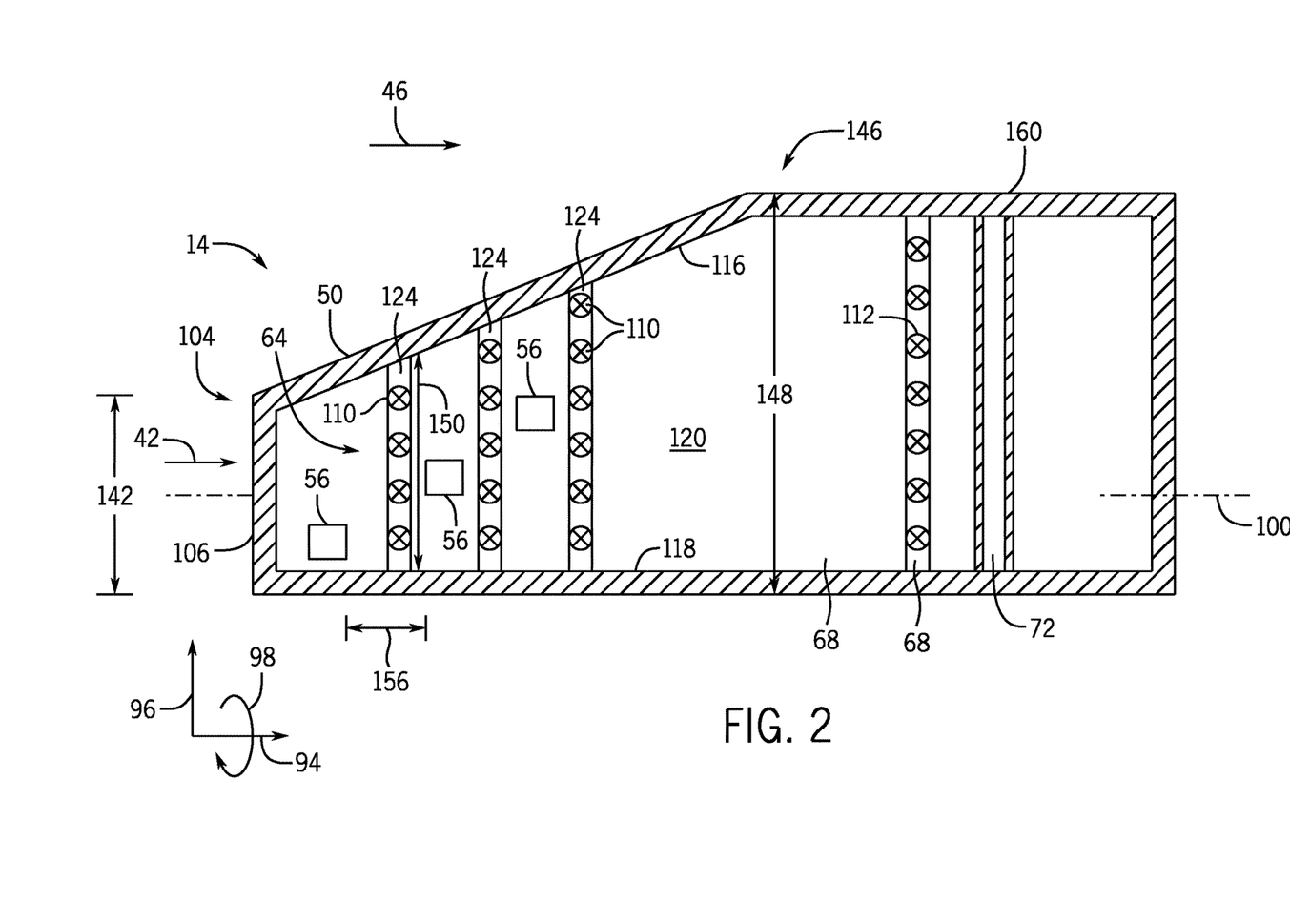
FIG. 2 is a cross-sectional view of the exhaust processing system of FIG. 1 having a plurality of mixing modules having turbulators, the mixing modules are disposed within a transition duct and an exhaust duct of the exhaust processing system, in accordance with an embodiment of the present disclosure.

Referring now to FIG. 2, a partial cross-sectional view of the exhaust processing system 14 is illustrated, in accordance with one embodiment. Various aspects of the exhaust processing system 14 may be described with reference to an axial direction or axis 94, a radial direction or axis 96, and a circumferential direction or axis 98 relative to the gas turbine engine and the exhaust duct 70. For example, the axis 94 corresponds to a longitudinal axis 100 or lengthwise direction of the gas turbine engine, the axis 96 corresponds to a crosswise or radial direction relative to the longitudinal axis 100, and the axis 98 corresponds to the circumferential direction about the axial axis 94 (e.g., longitudinal axis 10). An upstream end 104 of the transition duct 50 may include an opening 106 that fluidly couples the transition duct 50 to the turbine 22 to receive the exhaust gas flow 42. FIG. 2 additionally illustrates an embodiment of the mixing systems 64, 68 disposed within the transition duct 50 and exhaust duct 70, respectively. The mixing systems 64, 68 may include a plurality of turbulators 110, 112 radially 96 and circumferentially 98 about the longitudinal axis 100 between a first wall 116 and a second wall 118 of the exhaust processing system 14 (i.e., positioned within the flow path of the exhaust gas as it traverses the transmission duct). The walls 116, 118 define a passage 120 through which the exhaust gas stream 42 and the cooling fluid 58 flow from the transition section 50 to the exhaust duct 72.

The mixing systems 64, 68 may include one or more mixing modules 124 that include the turbulators 110, 112 arranged in a staggered configuration and/or inline relative to an adjacent turbulator 110, 112. As the exhaust gas 42 and the cooling air 58 flow through the mixing modules 124, a flow of the exhaust gas 42 and the cooling air 58 may transition from a laminar flow, as shown by arrows 125, to a turbulent flow, as shown by arrows 127. The turbulent flow 127 of the exhaust gas 42 and the cooling air 58 may encourage uniform mixing of the exhaust gas 42 and the cooling air 58.

In certain embodiments, the mixing system 64 may include multiple mixing modules 124. For example, returning to FIG. 2, the illustrated mixing system 64 includes an array of modules 124 arranged in stages at different positions along the longitudinal axis 100. In the illustrated embodiment, three mixing modules 124 (e.g., three stages of mixing) are shown. However, the mixing system 64 may include any suitable number of mixing modules 124. For example, the mixing system 64 may include 1, 2, 3, 4, 5, 10, 20, 30, 40, 50, or 100 mixing modules 124.

The transition duct 50 generally expands in the downstream direction 46. By way of non-limiting example, the upstream end 104 of the transition duct 50 may have a dimension 142 and an opposite downstream end 146 of the transition duct 50 may have a dimension 148 the may be between approximately 10% and approximately 75% larger than the dimension 142 of the upstream end 104. In certain embodiments, to account for an increase in the size of the flow path for the exhaust gas 42 and cooling air 58, each mixing module 124 may have a different dimension 150. For example, the dimension 150 of each module 124 may increase in the downstream direction 46 to conform to the expanding configuration of the transition duct 50. That is, the dimension 150 of the mixing module 124 closest to the upstream end 104 may be smaller than the dimension 150 of the mixing module 124 closest to the downstream end 146. In certain embodiments, the dimension 150 of each mixing module 124 may be the same, for example, in embodiments where the dimensions 142, 148 of the transition duct 50 are the same or the mixing modules 124 do not extend up to the wall 116.

The array of mixing modules 124 may be arranged such that each module 124 is disposed adjacent to an air injection tube 56 of the air injection system 54. For example, in certain embodiments, the air injection tubes 56 may be arranged at progressively different vertical and horizontal positions along the longitudinal axis 100. Each air injection tube 56 may be spaced apart from an adjacent air injection tube 56 by a dimension 156 depending on various factors such as a size of the transition duct 50, a desired number of mixing regions within the transition duct 50, a size of the mixing modules 124, among others. As such, one of the mixing modules 124 may be positioned within the space between each air injection tube 56. By positioning each mixing module 124 of the array between each air injection tube 56, the mixing modules 124 may improve mixing between the exhaust gas stream 42 and the cooling air 58, resulting in a uniform temperature distribution of the cooled exhaust gas 60. That is, the mixing modules 124 and the air injection tubes 56 may be interleaved with one another to form injection and mixing stages within the transition duct 50.

For example, the flow characteristics of the exhaust gas and cooling air mixture may be repeatedly changed by each mixing module 124 as the mixture flows in the downstream direction 46. The repeated change in the flow characteristics of the mixture may promote turbulent flow within the mixture, thereby encouraging uniform distribution of the exhaust gas stream 42 and the cooling air 60 and cooling the exhaust gas 42 within the transition duct 50. As such, the cooled exhaust gas 60 may be sufficiently cooled to a desired temperature for effective SCR processing, and may also have a uniform temperature distribution. The uniform temperature distribution of the cooled exhaust gas 60 may increase the effectiveness of the SCR process for removal of the combustion byproducts (e.g., $NO_x$).

As discussed above, the SCR process may be at least partially dependent upon the temperature of the exhaust gas. During cooling of the exhaust gas in the transition duct 50, the cooling air 58 may not be uniformly distributed within the exhaust gas stream. The non-uniform mixing of exhaust gas and cooling air may create localized regions of hot exhaust gas (e.g., hotspots) within the cooled exhaust gas. These localized regions of hot exhaust gas may not be at a suitable temperature for the SCR process, thereby decreasing the effectiveness of the SCR process. However, by using the mixing modules 124 to distribute and change the flow characteristics of the exhaust gas stream 42, the cooling air 58, or both, the mixing efficiency of the exhaust gas stream 42 and the cooling air 58 within the transition duct 50 may be improved compared to systems that do not include the mixing system 64, 68. Additionally, due to the improved mixing of the exhaust gas stream 42 and the cooling air 58, the cooled exhaust gas 60 may have a uniform temperature distribution suitable for effective SCR processing of the exhaust gas.

While in the illustrated embodiment the mixing modules 124 of the mixing system 64 are interleaved with the air injection tube 56, in other embodiments all or a set of the mixing modules 124 may be positioned upstream of the air injection system 54. For example, the mixing system 64 may be disposed between the opening 106 and the air injection system 54 (e.g., upstream of the first air injection tube 56 of the air injection system 54). The mixing modules 124 may swirl the exhaust gas stream 42 in multiple directions as the exhaust gas stream 42 exits the turbine 22 and enters the transition duct 50. The swirling of the exhaust stream 42 may encourage more a turbulent flow and distribute the exhaust gas stream 42 through the passage 120. This distribution of the exhaust gas stream 42 may facilitate cooling by dispersing the exhaust gas stream 42 within the exhaust processing system 14, which may allow the cooling air 58 to cool the exhaust gas stream 42 more efficiently compared to systems where the exhaust gas stream 42 is not uniformly distributed within the transition duct 50.

In certain embodiments, the exhaust processing system 14 may include a mixing system downstream of the transition duct 50. For example, as illustrated in FIG. 2, the mixing system 68 is disposed within the exhaust duct 70. The mixing system 68 may be positioned adjacent to and upstream of the injection system 72. Placement of the mixing system 68 adjacent to the injection system 72 may improve the effectiveness of the SCR process for removing the combustion byproducts. For example, as discussed above, the cooled exhaust gas 60 flows from the transition duct 50 into the exhaust duct 70, where it reacts with the reductant 74. As the cooled exhaust gas 70 continue to flow through the transition duct 50 away from the mixing module 124, the flow of the cooled exhaust gas 70 may transition from a turbulent flow back to a laminar flow. Therefore, it may be desirable to include the mixing system 68 in the exhaust duct 70 adjacent to the injection system 72. As such, the mixing system 68 may change the laminar flow to turbulent flow and distribute the cooled exhaust gas 60 as it flows into the exhaust duct 70, thereby encouraging the cooled exhaust duct 70 to uniformly mix with the reductant 74. Accordingly, the reaction between the reductant 74 and the combustion byproducts (e.g., NOx) in the cooled exhaust gas 60 may be improved compared to systems that do not include a mixing system, such as the mixing system 68, within the exhaust duct 70. Consequently, the effectiveness of the SCR process may also be improved.

Figure 3:
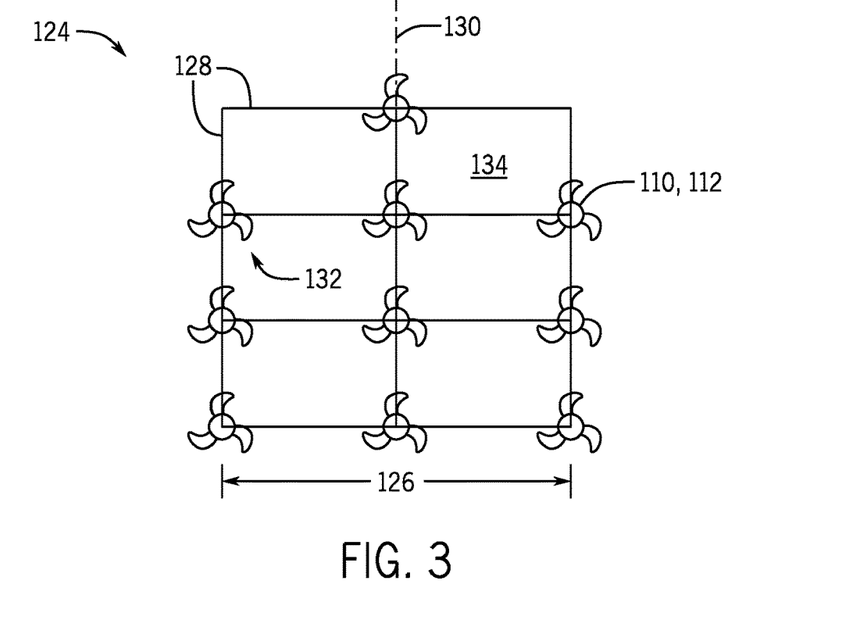
FIG. 3 is an elevational view of the mixing module of FIG. 2 having the turbulators aligned both vertically and horizontally on the mixing module, in accordance with an embodiment of the present disclosure.

For example, FIG. 3 illustrates a mixing module 124 of the mixing system 64, 68 having the turbulators 110, 112 disposed along a dimension 126 of the module 124 at various vertical and horizontal positions relative to a centerline axis 130 of the mixing module 124. The centerline axis 130 of the mixing system 64, 68 may be crosswise (e.g., perpendicular) to the longitudinal axis 100 of the exhaust processing system 14 such that the vertical and horizontal position of the turbulators 110, 112 are circumferentially 98 and radially 96 distributed about the longitudinal axis 100. The module 124 includes a plurality of supporting beams 128 oriented parallel (e.g., vertical) or crosswise (e.g., perpendicular, such as horizontal) to the centerline axis 130. The supporting beams 128 may intersect at various points 132 along the dimension 126 to form a grid-like supporting structure. The module 124 may include any suitable number of supporting beams 128 to support the turbulators 110, 112. Each of the supporting beams 128 may be spaced apart from an adjacent one of the supporting beams 128 in both vertical and horizontal directions relative to the centerline 130, thereby forming passages 134 through which the exhaust gas stream 42, the cooling air 58, or both may flow through. As shown in FIG. 3, the turbulators 110, 112 may be positioned at each of the intersecting point 132 of the module 124. As such, each turbulator 110, 112 may be aligned with another of the turbulator 110, 112 in an adjacent supporting beam 128.

Figure 4:
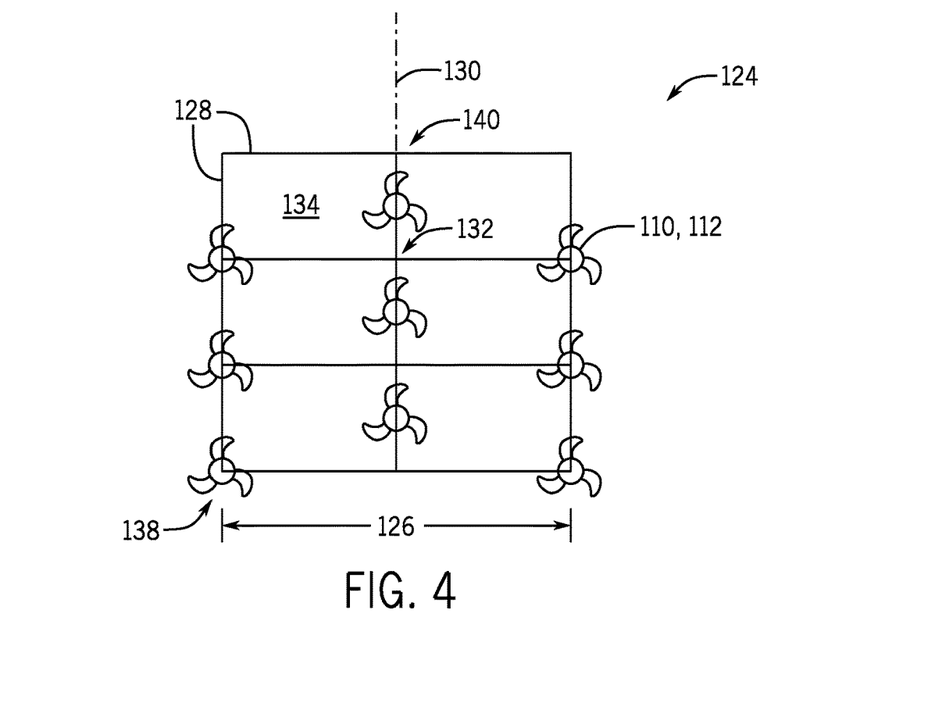
FIG. 4 is a front elevational view of the mixing module of FIG. 2 having the turbulators arranged in a staggered configuration on the mixing module, in accordance with an embodiment of the present disclosure.

In other embodiments, as shown in FIG. 4, the turbulators 110, 112 may have a staggered arrangement (e.g., staggered relative to a radial direction of the gas turbine engine 12) on the module 124. For example, in the illustrated embodiment, a first row 138 of turbulators 110, 112 may be positioned at the intersecting points 132 along the centerline axis 130 and a second row 140 of the turbulators 110, 112 may be offset from the intersecting points 132 along the centerline axis 130. As such, the turbulators 110, 112 in the first row 138 may not be inline with the turbulators 110, 112 in the second row 140.

Figure 5:
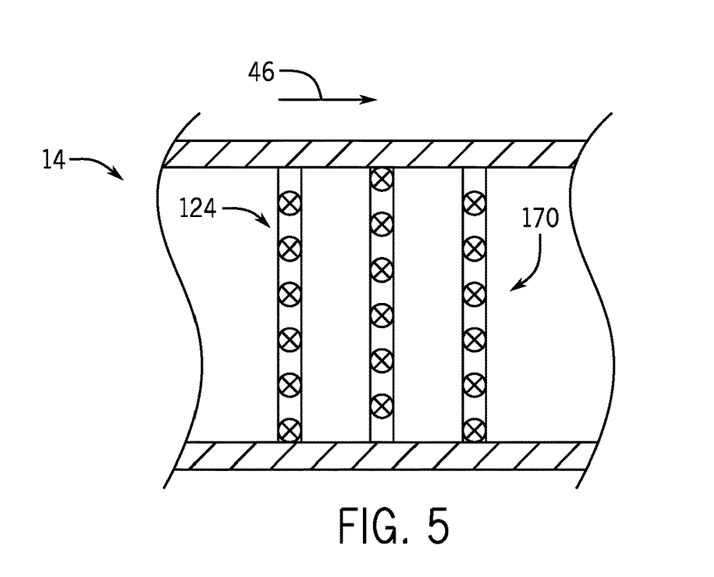
FIG. 5 is a plan view of the exhaust processing system of FIG. 2 having multiple mixing modules, each mixing module having a different arrangement of turbulators, in accordance with an embodiment of the present disclosure.

As discussed above, the mixing system 64 disposed in the transition duct 50 may have an array of mixing modules 124 arranged at any horizontal position along the longitudinal axis 100 of the exhaust processing system 14. The mixing system 68 disposed in the exhaust duct 70 may also have a similar arrangement. FIG. 5 illustrates an embodiment of an array 170 of the mixing modules 124, where the array 170 may be positioned in the transition duct 50 or the exhaust duct 70. The array 170 may include any suitable number of mixing modules 124. For example, the array 170 may include 2, 3, 4, 5, 10, 15, 20, 30, 40, 50, 80, or 100 mixing modules 124 such as between 2 and 100, 2 and 50, 2 and 20, 2, and 10, 4 and 6, and so forth. The mixing modules 124 in the array 170 may be arranged such that the turbulators 110, 112 of each mixing module 124 in the array 170 are inline with the turbulators 110, 112 of an adjacent mixing module 124. That is, the array 170 may have mixing modules 124 where the turbulators 110, 112 have the same respective positions on the module 124. In other embodiments, each mixing module 124 in the array 170 may have a different arrangement of turbulators 110, 112. For example, as illustrated in FIG. 5, the mixing modules 124 have a different arrangement of turbulators 110, 112. Staggering the turbulators 110, 112 in this way may help to reduce regions of laminar flow in the ducts 50, 70. As such, the turbulators 110, 112 of one mixing module 124 have are staggered configuration relative to the turbulators 110, 112 of an adjacent mixing module 124.

Figure 6:
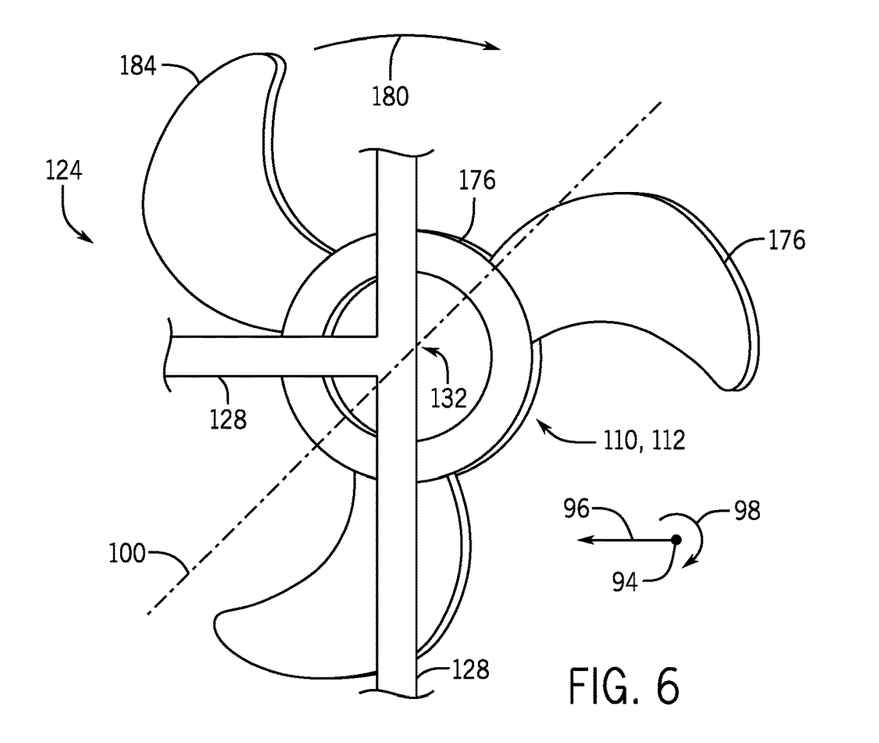
FIG. 6 is a perspective view of a turbulator of the mixing module of FIGS. 3 and 4, the turbulator including fins that rotate about an axis oriented substantially parallel to a longitudinal axis of the exhaust processing system, in accordance with an embodiment of the present disclosure.

The action of the turbulators 110, 112 may be further appreciated with reference to FIG. 6, which is a perspective view of a portion of the mixing module 124 and the turbulator 110, 112. In the illustrated embodiment, the turbulator 110, 112 includes a central ring 176 (e.g., annulus) defining a passage 177 (e.g., an annular passage) through which the exhaust gas stream 42, the cooling air 58, and/or the cooled exhaust gas 60 may flow. The central ring 176 includes fins radially 96 extending away from the central ring 176. The fins 96 may be circumferentially 98 spaced apart along a perimeter of the central ring 176. In the illustrated embodiment, the turbulator 110, 112 includes three fins 178. However, the turbulator 110, 112 may have any number of fins 178. For example, the turbulator may have 2, 3, 4, 5, 6, 7, 8, 9, 10, 20 or more fins 178 such as between 2 and 20, 2 and 10, 2 and 6, and so forth.

The turbulator 110, 112 may be configured to rotate in the circumferential direction 98 in a direction 180 (e.g., clockwise) to encourage turbulent flow characteristics of the exhaust gas stream 42, the cooling air 58, and/or the cooled exhaust gas 60. A tip 184 of the fins 178 may curve in the direction 180 to facilitate rotation of the turbulator 110, 112 (e.g., reduce drag on the turbulators 110, 112 during rotation), and to reduce regions of low flow immediately downstream of the fins 178. In other embodiments, the turbulator 110, 112 may rotate in a direction substantially opposite the direction 180 (e.g., counter clockwise). In these particular embodiments, the tip 184 of the fins 178 may be curved in the direction substantially opposite the direction 180. Additionally, the fins 178 may have a twist angle of between approximately 5 degrees to approximately 75 degrees.

Figure 7:
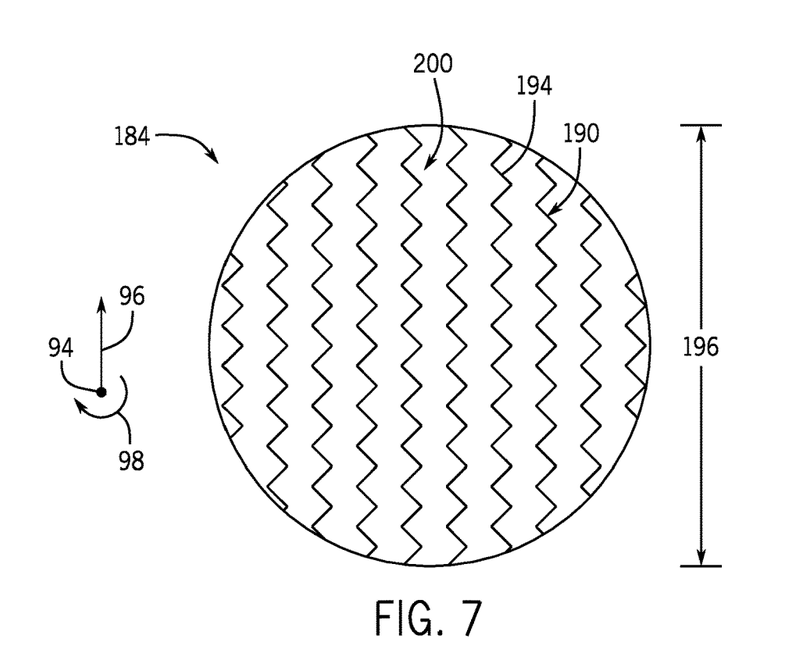
FIG. 7 is a front elevational view of a turbulator of the mixing module of FIGS. 2 and 5, the turbulator includes corrugated metal packing plates arranged in rows extending in a single radial direction, in accordance with an embodiment of the present disclosure.
Figure 8:
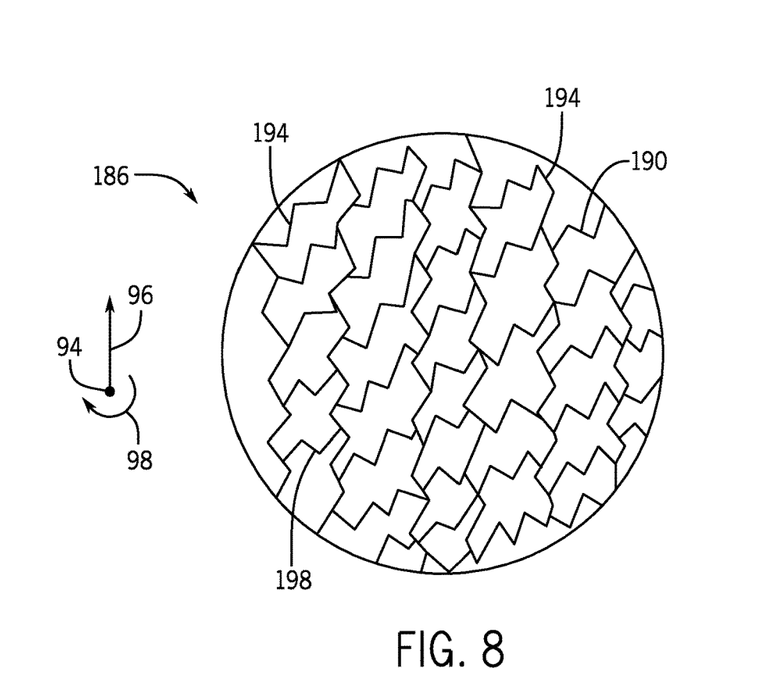
FIG. 8 is a front elevational view of a turbulator of the mixing module of FIGS. 2 and 5, the turbulator includes corrugated metal packing plates arranged in rows extending in multiple radial directions, in accordance with an embodiment of the present disclosure.

In other embodiments, the turbulators 110, 112 may include corrugated (e.g., ridged, grooved) packing plates. For example, FIGS. 7 and 8 illustrate a front elevational view of corrugated packing plates 184, 186, respectively, that may be used in the mixing module 124. The corrugated packing plates 184, 186 include layers of metal plates 190 having a corrugated surface. The metal plates 190 may promote heat transfer and uniform distribution of the exhaust gas stream 42, the cooling air 58, and/or the cooled exhaust gas 60 due, in part, to the turbulent flow created when the exhaust gas stream 42, the cooling air 58, and/or the cooled exhaust gas 60 impinges the corrugated surfaces of the metal plates 190.

The metal plates 190 may be arranged in rows 194 radially 96 extending at least a portion of a dimension 196 of the corrugated packing plate 184. For example, as illustrated in FIG. 7, the rows 194 radially extend along the dimension 196 in substantially the same radial direction 96. However, in other embodiments, the rows 194 may radially extend across a portion of the dimension 196 in different radial directions 96. For example, the corrugated packing plate 186 illustrated in FIG. 8 includes one set of rows 194 extending in one radial direction 96 (a first radial direction) and another set of rows 198 extending in a different radial direction 198 (a second radial direction different than the first). As such, the rows 194 may be oriented at an angle (e.g., perpendicular or acute) relative to the rows 198. While each plate 190 shown in FIG. 8 includes ridges (e.g., grooves) that are oriented at different angles relative to that axis 94, the plates 190 as a whole extend generally in one direction.

The rows 194, 198 form passages 200 between each metal plate 190 that allow the exhaust gas stream 42, the cooling air 58, and/or the cooled exhaust gas 60 to flow through the corrugated packing plate 184. As fluid (e.g., the exhaust gas stream 42, the cooling air 58, and/or the cooled exhaust gas 60) flows through the passages 200, the fluid impinges on the corrugated surface of the metal plates 190, which may change the flow direction within the turbulator 110, 112, resulting in a turbulent flow.

Figure 9:
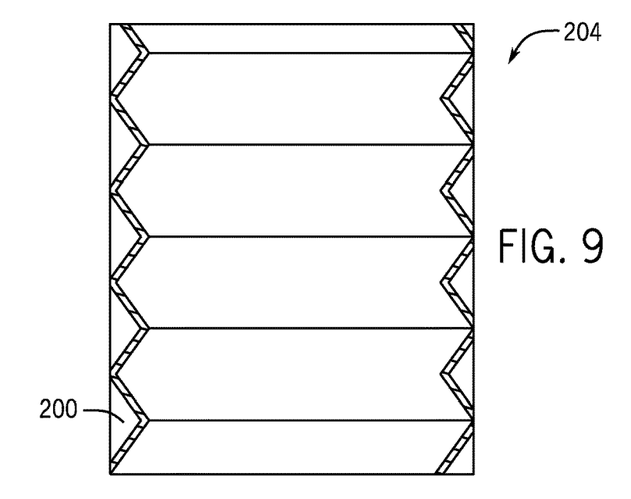
FIG. 9 is a side elevational view of a non-perforated metal plate that may be used with the corrugated metal packing plates of FIGS. 7 and 8, in accordance with an embodiment of the present disclosure.

The corrugated packing plates 184, 186 may include non-perforated plates, perforated plates, or both. For example, FIG. 9 illustrates a side elevational view of a non-perforated metal plate 204 that may be used in the corrugated packing plates 184, 186 to change a flow characteristic of the exhaust gas stream 42, the cooling air 58, and/or the cooled exhaust gas 60. The non-perforated metal plate 204 may block the fluid flowing through the corrugated packing plates 184, 186 from flowing into an adjacent row 194, 198, while encouraging turbulent flow within the passages 200. That is, the configuration shown in FIG. 9 may result in multiple zones of turbulent flow.

Figure 10:
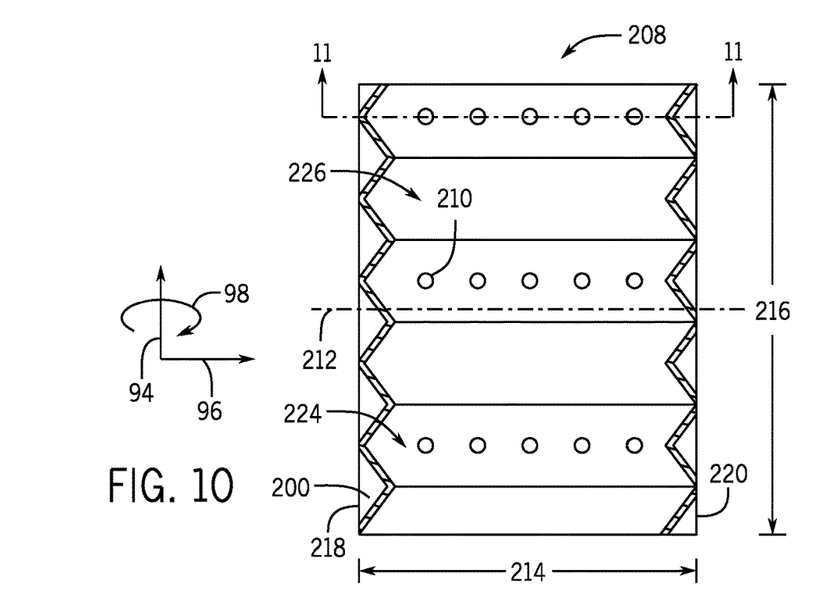
FIG. 10 is a side view of a perforated metal plate that may be used with the corrugated metal packing plates of FIGS. 7 and 8, in accordance with an embodiment of the present disclosure.

FIG. 10 illustrates a side elevational view of an embodiment of a perforated metal plate 208 that may also be used in the corrugated packing plates 184, 186 to change a flow characteristic of the exhaust gas stream 42, the cooling air 58, the cooled exhaust gas 60, or a combination thereof. The perforated metal plate 208 may include one or more holes 210 distributed at various axial 94 and radial 96 positions relative to an axis 212 of the perforated metal plate 208. The holes 210 axially 94 and radially 96 extend along at least a portion of dimensions 214, 216, respectively, of the perforated metal plate 194. For example, in the illustrated embodiment, the holes 210 extend from a plate upstream end 218 to a plate downstream end 220. The holes 210 may allow fluid communication between the passages 200 of the corrugated packing plates 184, 186 such that the fluid (e.g., the exhaust gas stream 42, the cooling air 58, and/or the cooled exhaust gas 60) may flow along and through the metal plates 190. This may encourage uniform mixing of the fluid as it flows through the mixing system 64, 68, and a uniform temperature distribution in the cooled exhaust gas 60.

The perforated metal plate 208 may also include perforated portions 224 and non-perforated portions 226. The portions 224, 226 may be arranged in any suitable pattern. As illustrated in FIG. 10, the portions 224, 226 alternate in the radial direction 96 along the dimension 216. As such each perforated portion 224 is adjacent to a non-perforated portion 226. However, in other embodiments, multiple perforated portions 224 and/or non-perforated portion 226 may be adjacent to one another. The particular arrangement of the portions 224, 226 may provide desirable changes in the flow characteristics of the fluid to enable uniform mixing within and downstream of the corrugated packing plates 184, 186.

Figure 11:
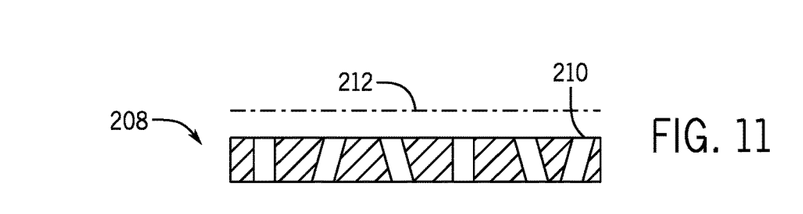
FIG. 11 is a cross sectional view of the perforated metal plate taken along line 11-11 having holes oriented a different angles, in accordance with an embodiment of the present disclosure.

In certain embodiments, the holes 210 of the perforated plate 208 may have a constant or variable dimension (e.g., where the holes are annular) along the axis 212. The diameter may progressively increase or decrease from the first plate end 218 to the second plate end 220 or vice versa. The diameter of the holes 210 may also increase or decrease toward both plate ends 218, 220 along the axis 212. Additionally, the holes may be oriented at an angle relative to the axis 212. For example, FIG. 11 illustrates a cross-sectional view of a portion of the perforated metal plate 208 along line 11-11. In the illustrated embodiment, the holes 210 of the perforated metal plate 208 are oriented at different angles (perpendicular or acutely angled relative to the axis 212). The angled orientation of the holes 210 may increase the mixing and heat transfer efficiency of the fluid (e.g., the exhaust gas stream 42, the cooling air 58, and/or the cooled exhaust gas 60) as it flows through the corrugated packing plate 184, 186. For example, the angled holes 210 may change the flow direction of the fluid as it flows across the perforated metal plate 208, into the adjacent passages 200, and impinges on the corrugated surfaces of the metal plate 190. The change in the flow direction of the fluid may enhance the turbulent flow created when the fluid impinges on the corrugated surfaces, thereby allowing uniform mixing of the fluid (e.g., mixing of the exhaust gas stream 42, the cooling air 58, the cooled exhaust gas 60, and the reductant 74). As such, the effectiveness of the SCR process for removing the combustion byproducts (e.g., $NO_x$) may be improved compared to systems that do not include the mixing systems 64, 68 within the exhaust processing system 14.

Any of the embodiments described herein may be used in any suitable combination to achieve desired heat transfer and fluid flow characteristics. For example, as discussed above with reference to FIGS. 3 and 4, the mixing module 124 may have multiple turbulators 110, 112 arranged at different vertical and horizontal positions along the dimension 126. In certain embodiments, each turbulator 110, 112 of the mixing module 124 may promote a different flow characteristic of the exhaust gas stream 42, the cooling air 58, and/or the cooled exhaust gas 60. For example, referring back to FIG. 6, the turbulators 110, 112 may rotate about the longitudinal axis 100 of the exhaust processing system 14. In certain embodiments, the turbulators 110, 112 may rotate in the same direction (e.g., the direction 180 (clockwise) or a direction opposite the direction 180 (counter clockwise)). In other embodiments, a portion of the turbulators 110, 112 of the mixing module 124 may rotate in the direction 180 (e.g., clockwise) and another portion of the turbulators 110, 112 may rotate in the direction substantially opposite the direction 180 (e.g., counter clockwise).

Similarly, the turbulators 110, 112 of each module 124 in the array 170 (See FIG. 5) of the mixing system 68, 64 may rotate in the same direction or in a direction different from an adjacent mixing module 124 in the array 170. By way of example, a mixing module 124 closest to the upstream end 104 of the transition duct 50 may rotate in the direction 180 (e.g., clockwise) and the following mixing module 124 in the downstream direction 46 may rotate in the direction substantially opposite the direction 180 (e.g., counter clockwise). Varying the rotating direction (e.g., the direction 180) of the turbulators 110, 112 may create turbulent flow within the exhaust processing system 14 such that the exhaust gas stream 42 and the cooled air 58 may uniformly mix and be distributed throughout the exhaust processing system 14. In this way, a uniform temperature distribution in the cooled exhaust gas 60 may be achieved. Moreover, because the cooling air 58 may effectively mix with the exhaust gas stream 42 by using the mixing system 64, the cooled exhaust gas 60 may be cooled to a temperature that is suitable for effective removal of the combustion byproducts (e.g., $NO_x$) in the SCR system 80 compared to systems that do not use the mixing system 64. Additionally, the variable rotation of the turbulators 110, 112 within a single mixing module 124 or between mixing modules 124 in the array 170 in the mixing system 68 may allow uniform mixing between the cooled exhaust gas 60 and the reductant 74 (e.g. via the mixing system 68) within the exhaust duct 70, thereby further improving the SCR processes compared to systems that do not include mixing modules 124 within the exhaust duct 70.

In certain embodiments, the mixing modules 124 may have different types of turbulators 110, 112. For example, one mixing module 124 in the array 170 may use the rotating turbulators shown in FIG. 6 and another mixing module 124 of the array 170 may use the corrugated packing plate 184, 186. In other embodiments, the different types of turbulators 110, 112 may be within a single mixing module 124. For example, a portion of the turbulators 110, 112 of the mixing module 124 may be the corrugated packing plate 184, 186 and another portion of the turbulators 110, 112 may be rotating turbulators (e.g., See FIG. 6). Having different types of turbulators 110, 112 within the array 170 and/or each mixing module 124 may create a desirable turbulent flow for effectively distributing and mixing the exhaust gas stream 42, the cooling air 58, and/or the cooled exhaust gas 60 within the exhaust processing system 14, resulting in a uniform temperature distribution of the cooled exhaust gas 60 before entering the SCR system 80.

As discussed above, the various techniques set forth herein may provide for the mixing of an exhaust gas stream and cooling air in order to enhance the uniformity of the temperature and/or velocity distributions of the exhaust gas stream, while also cooling the exhaust gas stream to enhance the effectiveness of a selective catalyst reduction process. For instance, the techniques disclosed herein could cover any combination of mixing modules and turbulator configurations the change a flow characteristic of the exhaust gas stream, the cooling air, and/or the cooled exhaust gas. The change in flow characteristics of the exhaust gas, the cooling air, and/or the cooled exhaust gas may create turbulent flow, which may facilitate mixing and cooling of the exhaust gas stream exiting a gas turbine engine. The disclosed techniques and configurations of the mixing system 64, 68 are intended to be only examples of certain embodiments, and should not be construed as being limiting in any way.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A simple-cycle gas turbine system comprising:
an injection system comprising a plurality of injection tubes configured to inject a fluid into a duct of an exhaust processing system configured to process exhaust gas generated by a gas turbine engine, wherein the exhaust processing system comprises a selective catalytic reduction (SCR) system disposed within an exhaust duct of the exhaust processing system and configured to reduce a level of nitrogen oxides ($NO_x$) within the exhaust gas; and
a mixing system positioned adjacent to the plurality of injection tubes and within the exhaust processing system, wherein the mixing system comprises a mixing module having a grid comprising a plurality of rotary turbulators configured to swirl the fluid, or the exhaust gas, or both, in a first swirl direction to encourage turbulent flow along an axis of the exhaust processing system and thereby facilitate mixing between the fluid and the exhaust gas, wherein the mixing module is disposed within a transition duct of the exhaust processing system positioned between the gas turbine engine and the exhaust duct such that each rotary turbulator of the plurality of rotary turbulators is arranged at a different position relative to another rotary turbulator along a dimension of the grid, wherein the dimension is crosswise to the axis, and wherein each rotary turbulator of the plurality of rotary turbulators comprises a shaft configured to rotate the respective rotary turbulator about the axis.

2. The system of claim 1, wherein the mixing module is a first mixing module and the plurality of rotary turbulators is a first plurality of rotary turbulators, and wherein the mixing system comprises a second mixing module positioned downstream of the first mixing module and having a second plurality of rotary turbulators configured to swirl the fluid, the exhaust gas, or both, in a second swirl direction within the exhaust processing system.

3. The system of claim 2, wherein the first and second swirl directions are the same.

4. The system of claim 2, wherein the first and second swirl directions are different.

5. The system of claim 2, wherein the first plurality of rotary turbulators and the second plurality of rotary turbulators are aligned along a longitudinal axis of the exhaust processing system.

6. The system of claim 2, wherein the first plurality of rotary turbulators and the second plurality of rotary turbulators are arranged in a staggered configuration along a longitudinal axis of the exhaust processing system.

7. The system of claim 2, wherein the first mixing module, the second mixing module, or both are disposed between injection tubes of the plurality of injection tubes.

8. The system of claim 1, wherein each rotary turbulator of the plurality of rotary turbulators comprises a plurality of fins radially extending from a center of the rotary turbulator, and wherein a fin of the plurality of fins is configured to rotate about a longitudinal axis of the exhaust processing system in the first swirl direction.

9. The system of claim 1, wherein the mixing module comprises a plurality of corrugated packing plates configured to swirl the air, the exhaust gas, or both at least in the first swirl direction.

10. The system of claim 9, wherein the corrugated packing plates are perforated.

11. The system of claim 1, wherein the injection system is configured to inject cooling air as the fluid into the transition duct, wherein the transition duct is fluidly coupled to a turbine of the gas turbine engine, and wherein the mixing module is configured to encourage turbulent flow of the exhaust gas and the cooling fluid along the axis of the exhaust processing system and thereby facilitate mixing and heat exchange between the cooling air and the exhaust gas.

12. The system of claim 1, wherein the injection system is configured to inject a reductant as the fluid into the exhaust duct containing a catalyst of the SCR system, wherein a second mixing module of the mixing system is disposed within the exhaust duct, and wherein the second mixing module is configured to encourage turbulent flow of the exhaust gas and the reductant along the axis of the exhaust processing system and thereby facilitate mixing between the reductant and the exhaust gas.

13. A simple cycle heavy-duty gas turbine system, comprising:
a mixing system disposed in an exhaust processing system of the simple cycle heavy-duty gas turbine system, wherein the mixing system comprises:
a first mixing module comprising a first grid having a first plurality of rotary turbulators configured to swirl cooling air, an exhaust stream generated by a heavy-duty gas turbine engine of the simple cycle heavy-duty gas turbine system, or both, in a first swirl direction; and
a second mixing module comprising a second grid having a second plurality of rotary turbulators configured to swirl the cooling air, the exhaust stream, or both, in a second swirl direction, wherein the first mixing module, the second mixing module, or both are disposed within a transition duct of the exhaust processing system such that each rotary turbulator of the first and second plurality of rotary turbulators is arranged at a different position relative to another rotary turbulator along a dimension of the respective grid, wherein the dimension is crosswise to a flow direction through the exhaust processing system, and wherein each rotary turbulator of the first and second plurality of rotary turbulators comprises a shaft configured to rotate the rotary turbulator about a longitudinal axis of the exhaust processing system.

14. The system of claim 13, wherein the mixing system is positioned adjacent to an air injection system, wherein the air injection system comprises a plurality of air injection tubes configured to supply the cooling air to the transition section.

15. The system of claim 14, wherein the first mixing module, the second mixing module, or both, are disposed between air injection tubes of the plurality of air injection tubes.

16. The system of claim 13, wherein the first and second swirl directions are the same.

17. The system of claim 13, wherein the first and second swirl directions are different.

18. The system of claim 13, wherein the first plurality of rotary turbulators and the second plurality of rotary turbulators are aligned along a longitudinal axis of the exhaust processing system.

19. The system of claim 13, wherein the first plurality of rotary turbulators and the second plurality of rotary turbulators are arranged in a staggered configuration along a longitudinal axis of the exhaust processing system.

20. A method of processing exhaust gas in a simple cycle gas turbine system, comprising:
flowing an exhaust stream from a gas turbine engine and into a transition section of an exhaust processing system;
injecting cooling air into a flow of the exhaust stream in the transition section using an air injection system comprising a plurality of air injection tubes configured to inject the cooling air;
swirling the exhaust stream, or the cooling air, or both, in the transition section of the exhaust processing system using a mixing system having an array of mixing modules, wherein each mixing module of the array of mixing modules comprises a grid having a plurality of rotary turbulators configured to swirl the exhaust stream, the cooling air, or both in a first direction, a second direction, or both, and wherein swirling the exhaust gas, the air, or both mixes and facilitates heat transfer between the exhaust steam and the cooling air within the exhaust processing system to generate a cooled exhaust gas, wherein each rotary turbulator of the plurality of rotary turbulators comprises a shaft configured to rotate the respective rotary turbulator;
directing the cooled exhaust gas to a selective catalytic reduction (SCR) system; and
reducing a level of nitrogen oxides (NOx) in the cooled exhaust gas using the SCR system.

\* \* \* \* \*